US012776599B2

(12) United States Patent
Huang

(10) Patent No.: US 12,776,599 B2
(45) Date of Patent: Oct. 27, 2026

(54) ELECTRICAL CONNECTOR FOR IMPROVING HIGH FREQUENCY CHARACTERISTICS

(71) Applicant: LOTES CO., LTD, Keelung (TW)

(72) Inventor: Chang Wei Huang, Keelung (TW)

(73) Assignee: LOTES CO., LTD, Keelung (TW)

( * ) Notice: Subject to any disclaimer, the term of this patent is extended or adjusted under 35 U.S.C. 154(b) by 337 days.

(21) Appl. No.: 18/650,457

(22) Filed: Apr. 30, 2024

(65) Prior Publication Data

US 2024/0421517 A1 Dec. 19, 2024

(30) Foreign Application Priority Data

Jun. 16, 2023 (CN) ......................... 202321550737.1

(51) Int. Cl.

| | |
|---|---|
| ***H01R 13/50*** | (2006.01) |
| ***H01R 12/55*** | (2011.01) |
| ***H01R 12/70*** | (2011.01) |
| ***H01R 13/24*** | (2006.01) |
| ***H01R 13/40*** | (2006.01) |

(52) U.S. Cl.

CPC ......... *H01R 12/7076* (2013.01); *H01R 12/55* (2013.01); *H01R 12/707* (2013.01); *H01R 13/2407* (2013.01); *H01R 13/40* (2013.01); *H01R 13/50* (2013.01)

(58) Field of Classification Search

None

See application file for complete search history.

(56) References Cited

U.S. PATENT DOCUMENTS 10,389,050 B2 * 8/2019 Huang ................. H01R 12/585

FOREIGN PATENT DOCUMENTS

| | | | |
|---|---|---|---|
| CN | 202308486 U * | 7/2012 | ........... H01R 12/714 |
| CN | 112397921 A | 2/2021 | |
| CN | 216312089 U | 4/2022 | |

* cited by examiner

*Primary Examiner* — Tho D Ta

(74) *Attorney, Agent, or Firm* — Troutman Pepper Locke LLP; Tim Tingkang Xia, Esq.

(57) ABSTRACT

An electrical connector includes an insulating body and conductive terminals. The insulating body has an upper surface and a lower surface provided opposite to each other along a vertical direction, two first side edges and two second side edges. The insulating body further has a first region and a second region. Each conductive terminal has an elastic arm and an abutting arm connected to the elastic arm. The conductive terminals include first terminals provided in the first region and second terminals provided in the second region. Viewing from a top view angle, the elastic arm of each first terminal extends along a first direction parallel to or perpendicular to the first side edges, and the elastic arm of each second terminal extends along a second direction forming an oblique angle with the first side edges. The first direction and the second direction are both perpendicular to the vertical direction.

11 Claims, 12 Drawing Sheets

100

ELECTRICAL CONNECTOR FOR IMPROVING HIGH FREQUENCY CHARACTERISTICS

CROSS-REFERENCE TO RELATED PATENT APPLICATION

This non-provisional application claims priority to and the benefit of, pursuant to 35 U.S.C. § 119(a), patent application Serial No. CN202321550737.1 filed in China on Jun. 16, 2023. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector for improving high frequency characteristics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector includes an insulating body and a plurality of conductive terminals provided in the insulating body. The insulating body has a first region and a second region. The insulating body has two first side edges provided opposite to each other and two second side edges provided opposite to each other, and the first side edges and the second side edges are perpendicular to each other. In the conductive terminals, each conductive terminal has an elastic arm, and the elastic arm has a contact portion. The conductive terminals include a plurality of first terminals provided in the first region and a plurality of second terminals provided in the second region. Viewing from a top view angle, the elastic arm of each first terminal extends along a first direction parallel to or perpendicular to the first side edges, and the first terminals are provided in a plurality of rows in the first direction; the elastic arm of each second terminal extends along a second direction parallel to or perpendicular to the second side edges, and the second terminals are provided in a plurality of rows in the second direction.

However, in the case where the space of the insulating body is limited and the conductive terminals are arranged as described above, the insulating body may receive fewer conductive terminals, which cannot meet the increasingly high signal transmission requirements to the electrical connector in the current market.

Therefore, a heretofore unaddressed need to design a new electrical connector exists in the art to address the aforementioned deficiencies and inadequacies.

SUMMARY

The present invention is directed to an electrical connector, which may change the arrangement method of the second terminals by having the elastic arm of each of the second terminals extending along a second direction forming an oblique angle with the first side edges, thereby allowing the second terminals to be densified, and increasing the signal transmission speed thereof.

To achieve the foregoing objective, the present invention adopts the following technical solutions. An electrical connector includes: an insulating body, having an upper surface and a lower surface provided opposite to each other along a vertical direction, wherein the insulating body has at least one first region and at least one second region, the insulating body has two first side edges provided opposite to each other and two second side edges provided opposite to each other, and the first side edges and the second side edges are perpendicular to each other; and a plurality of conductive terminals, wherein each of the conductive terminals has an elastic arm and an abutting arm connected to the elastic arm, the abutting arm has a contact portion, the conductive terminals include a plurality of first terminals provided in the first region and a plurality of second terminals provided in the second region, and viewing from a top view angle, the elastic arm of each of the first terminals extends along a first direction parallel to or perpendicular to the first side edges, the elastic arm of each of the second terminals extends along a second direction forming an oblique angle with the first side edges, and the first direction and the second direction are both perpendicular to the vertical direction.

In certain embodiments, the insulating body has a plurality of accommodating holes running through the upper surface and the lower surface, the conductive terminals are one-to-one correspondingly accommodated in the accommodating holes, the elastic arms of the conductive terminals are exposed upward out of the upper surface, each of the conductive terminals has a soldering portion, the soldering portions of the conductive terminals are exposed downward out of the lower surface, the insulating body further has a plurality of position limiting protruding blocks protruding downward out of the lower surface, each of the accommodating holes are provided with two of the position limiting protruding blocks, the two of the position limiting protruding blocks are located at two opposite sides of a corresponding one of the accommodating holes in the first direction and are provided right opposite to each other, the soldering portion of each of the conductive terminals includes two embracing arms provided opposite to each other, the two embracing arms altogether clamp a solder ball, the two embracing arms of each of the second terminals are provided opposite to each other along a third direction, the third direction is perpendicular to the second direction and the vertical direction, the two of the position limiting protruding blocks are configured to limit the solder ball from moving in the first direction, and viewing from a bottom view angle, a shortest distance between one of the two embracing arms of each of the second terminals and a same corresponding one of the position limiting protruding blocks and a shortest distance between the other of the two embracing arms of each of the second terminals and the same corresponding one of the position limiting protruding blocks are unequal.

In certain embodiments, viewing from the bottom view angle, the two embracing arms of each of the first terminals and each of two corresponding ones of the position limiting protruding blocks are provided at intervals, and the two embracing arms of each of the first terminals are provided symmetrically relative to the first direction.

In certain embodiments, the first terminals include single-ended signal terminals, and the second terminals include ground terminals and differential signal terminals.

In certain embodiments, each of the first terminals and the second terminals has a base portion, a through hole running through the base portion and a through slot running through the elastic arm, the base portion is located below the contact portion and is connected to the elastic arm, a maximum width of the base portion of each of the first terminals in a direction perpendicular to the vertical direction is less than a maximum width of the base portion of each of the second terminals in the direction perpendicular to the vertical direction, and a maximum width of the elastic portion of each of the first terminals in the direction perpendicular to the vertical direction is less than a maximum width of the elastic arm of each of the second terminals in the direction perpendicular to the vertical direction.

In certain embodiments, each of the conductive terminals has a base portion connected to one end of the elastic arm and a through hole running through the base portion, the base portion is provided in the insulating body, the through hole has a wide portion and a narrow portion, the wide portion is in upward communication with the narrow portion, a maximum width of the wide portion of each of the first terminals in a direction perpendicular to the vertical direction is less than a maximum width of the wide portion of each of the second terminals in the direction perpendicular to the vertical direction.

In certain embodiments, each of the second terminals further has a base portion located in the insulating body, the base portion has a width direction being defined to be perpendicular to the vertical direction, the elastic arm of each of the second terminals is formed by extending upward from the corresponding base portion, the elastic arm of each of the second terminals has a first elastic arm and a second elastic arm provided at an interval in the width direction, a through slot is formed between the first elastic arm and the second elastic arm, one end of the first elastic arm is connected to the abutting arm, one end of the second elastic arm is connected to the corresponding abutting arm, a maximum width of another end of the first elastic arm away from the corresponding abutting arm in the width direction is greater than a maximum width of another end of the second elastic arm away from the abutting arm in the width direction, a first central line is defined for the base portion in the width direction, a second central line is defined for the contact portion in the width direction, and in the width direction, the second central line and the first elastic arm are located at two opposite sides of the first central line. In certain embodiments, the base portion is a flat plate structure extending vertically, the through slot extends to an upper end of the base portion, and a width of a connecting location of the first elastic arm and the corresponding abutting arm is equal to a width of a connecting location of the second elastic arm and the corresponding abutting arm.

In certain embodiments, the elastic arm of each of the second terminals includes a first portion and a second portion connected to each other, the first portion is connected to the corresponding abutting arm, the second portion is connected to the corresponding base portion, the through slot extends on the first portion and the second portion, and the first portion and the corresponding abutting arm are provided symmetrically relative to the second central line.

In certain embodiments, each of the second terminals has a soldering portion located below the corresponding base portion, a third central line is defined for the soldering portion in the width direction, and the third central line and the second central line are located at a same side of the first central line in the width direction.

In certain embodiments, the insulating body is provided with a plurality of first supporting posts protruding from the upper surface and corresponding to the first region and a plurality of second supporting posts protruding from the upper surface and corresponding to the second region, the second terminals are provided in a plurality of rows along the second direction, two adjacent rows of the second terminals are provided to be staggered, one of the second supporting posts is configured between two adjacent ones of the second terminals aligned in the second direction, a third direction is defined to be perpendicular to the second direction and the vertical direction, each of the second supporting posts has two first side surfaces provided opposite to each other in the third direction, a second central line is defined for the contact portion of each of the second terminals in the third direction, the second central line does not pass a corresponding one of the second supporting posts, and viewing from the top view angle, the abutting arm of each of the second terminals is formed by extending from the corresponding elastic arm toward one side of the second direction, and the two first side surfaces are close to each other along the other side of the second direction.

Compared to the related art, certain embodiments of the present invention have the following beneficial effects:

The elastic arm of each second terminal extends along the second direction forming an oblique angle with the first side edges, thereby changing the arrangement of the second terminals, such that the second terminals in the second region may be densified. That is, the insulating body may receive more conductive terminals in the same area, thereby increasing the signal transmission speed of the electrical connector. The elastic arm of each first terminal extends along the first direction parallel to or perpendicular to the first side edges, which is equivalent to the arrangement of the first terminals in the first region not changing relative to the arrangement of the first terminals in the related art, allowing the first terminals to be assembled into the first region of the insulating body, thus reducing the production cost for manufacturing the electrical connector.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
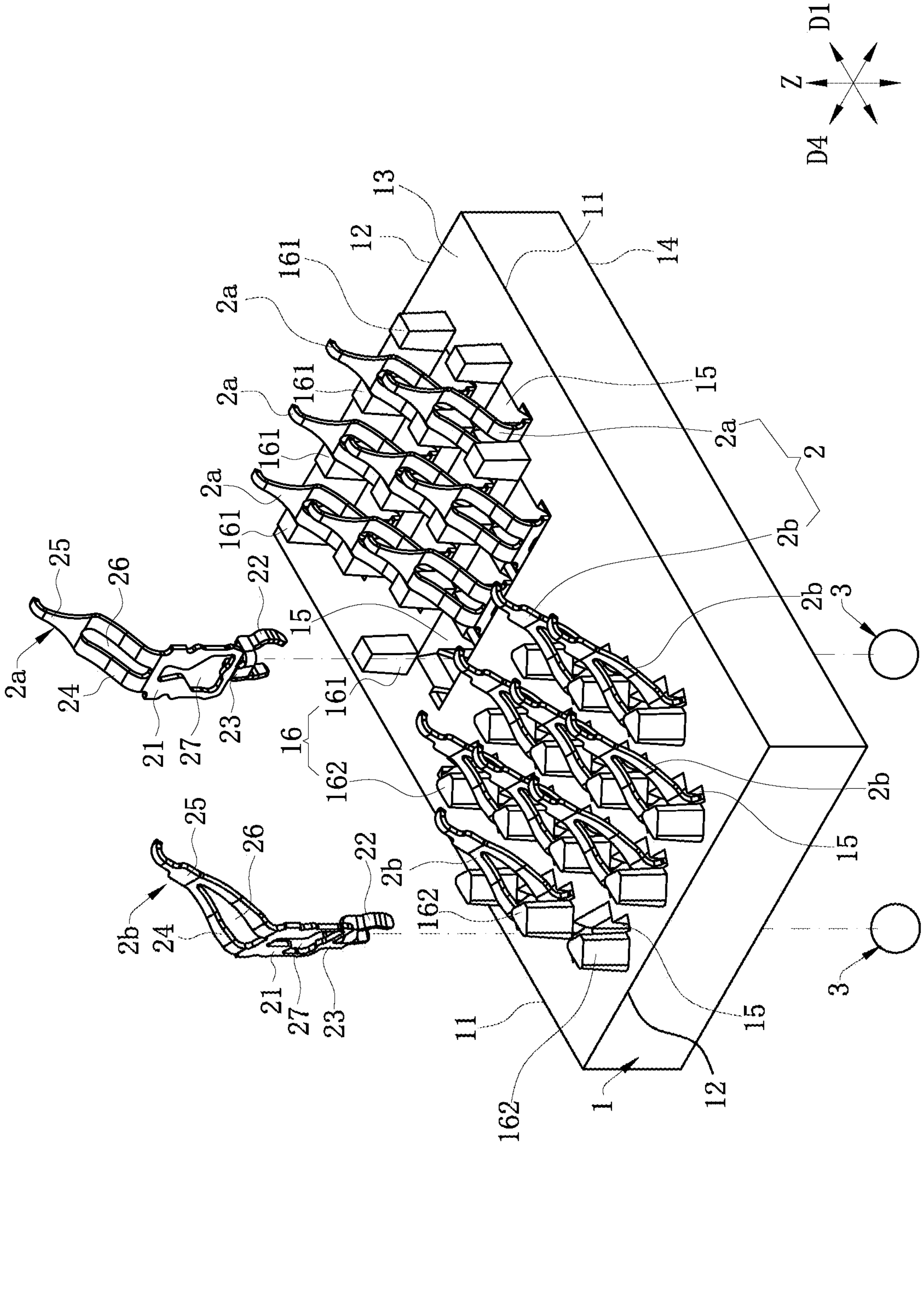
FIG. 1 is a perspective view of an electrical connector according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-12. In accordance with the purposes of this invention, as embodied and broadly described herein, this invention, in one aspect, relates to an electrical connector.

FIG. 1 to FIG. 12 show an electrical connector 100 according to certain embodiments of the present invention. The electrical connector 100 is used to be electrically connected to a chip module (not shown), and is conductively connected to a circuit board (not shown). The electrical connector 100 includes an insulating body 1, a plurality of conductive terminals 2 provided in the insulating body 1 and a plurality of solder balls 3 clamped by the corresponding conductive terminals 2. The conductive terminals 2 are soldered to the circuit board (not shown) by the solder balls 3.

As shown in FIG. 1, each conductive terminal 2 is formed by punching a metal plate, and includes a base portion 21, a soldering portion 22 located below the base portion 21, a connecting portion 23 connecting the base portion 21 and the soldering portion 22, an elastic arm 24 extending upward from one end of the base portion 21, an abutting arm 25 formed by continuously extending from the elastic arm 24, a through slot 26 running through the elastic arm 24, a through hole 27 running through the base portion 21 and a plurality of protrusions. The through slot 26 is located above the through hole 27 and is provided at an interval with the through hole 27. The abutting arm 25 has a contact portion 251 and a widening portion 252. The contact portion 251 is located above the base portion 21. The widening portion 252 connects the contact portion 251 and the elastic arm 24, and has two side surfaces 2521 provided opposite to each other. The through hole 27 has a wide portion 271 and a narrow portion 272, and the wide portion 271 is located below the narrow portion 272 and is in communication with the narrow portion 272 (referring to FIG. 8 and FIG. 11).

Figure 2:
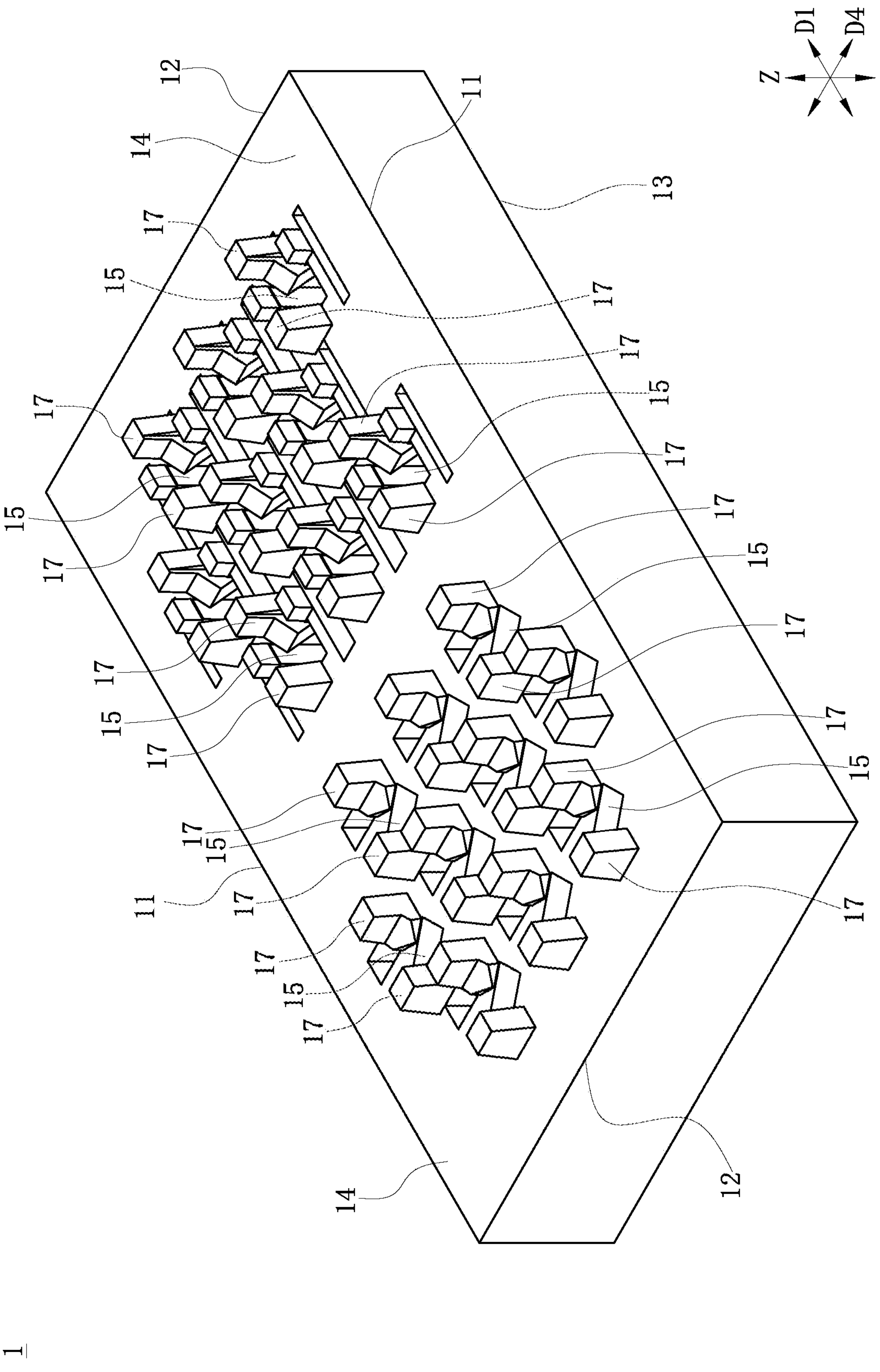
FIG. 2 is a perspective view of FIG. 1 being 180° inversed and only showing the insulating body.
Figure 3:
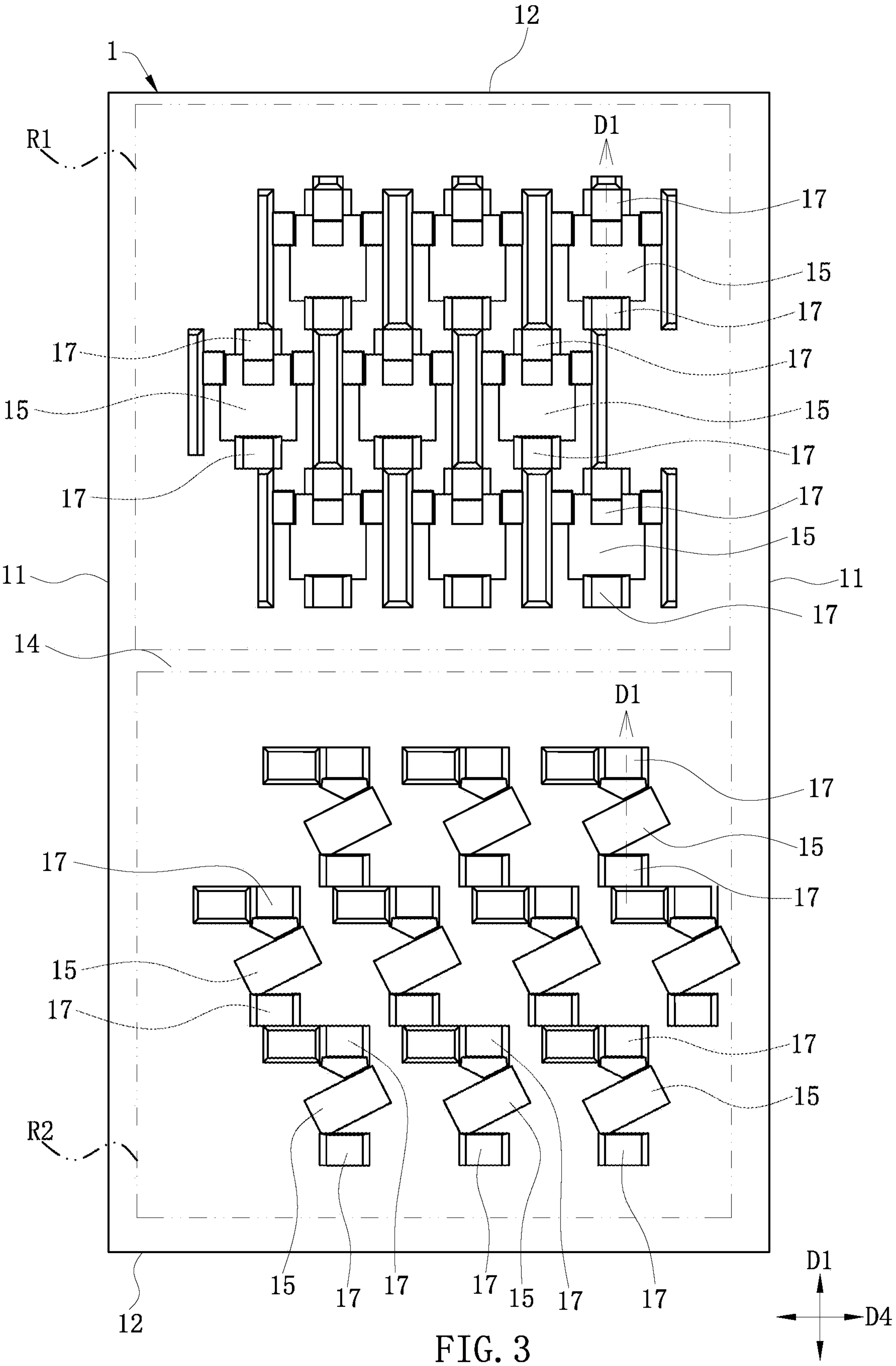
FIG. 3 is a top view of FIG. 2 being 180° inversed along the first direction.

As shown in FIG. 1 and FIG. 2, the insulating body 1 is made of a plastic material, and includes two first side edges 11 provided opposite to each other and two second side edges 12 provided opposite to each other, and an upper surface 13 and a lower surface 14 provided opposite to each other along a vertical direction. The first side edges 11 and the second side edges 12 are perpendicular to each other. A first direction D1 and a second direction D2 are perpendicular to the vertical direction. The insulating body 1 further has a plurality of accommodating holes 15 running through the upper surface 13 and the lower surface 14 along the vertical direction. The conductive terminals 2 are one-to-one correspondingly accommodated in the accommodating holes 15. The base portion 21 is accommodated in a corresponding accommodating hole 15, and is positioned in the corresponding accommodating hole 15 by the protrusions. The elastic arm 24 is partially exposed upward out of the upper surface 13, and the soldering portion 22 is exposed downward out of the lower surface 14 (referring to FIG. 6 and FIG. 7).

Figure 5:
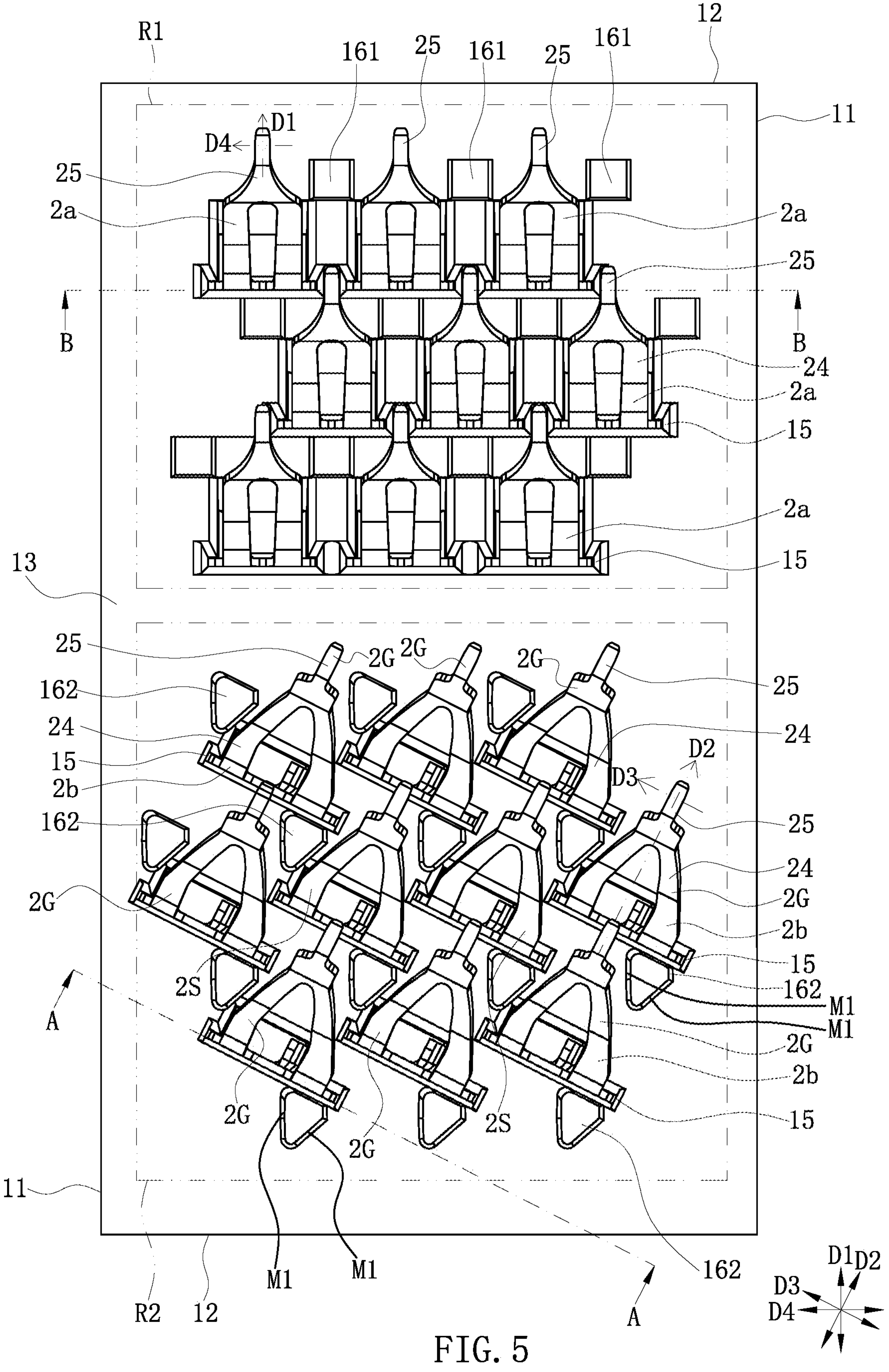
FIG. 5 is a top view of FIG. 1 being 180° inversed along the first direction after the assembly of the electrical connector is complete.
Figure 6:
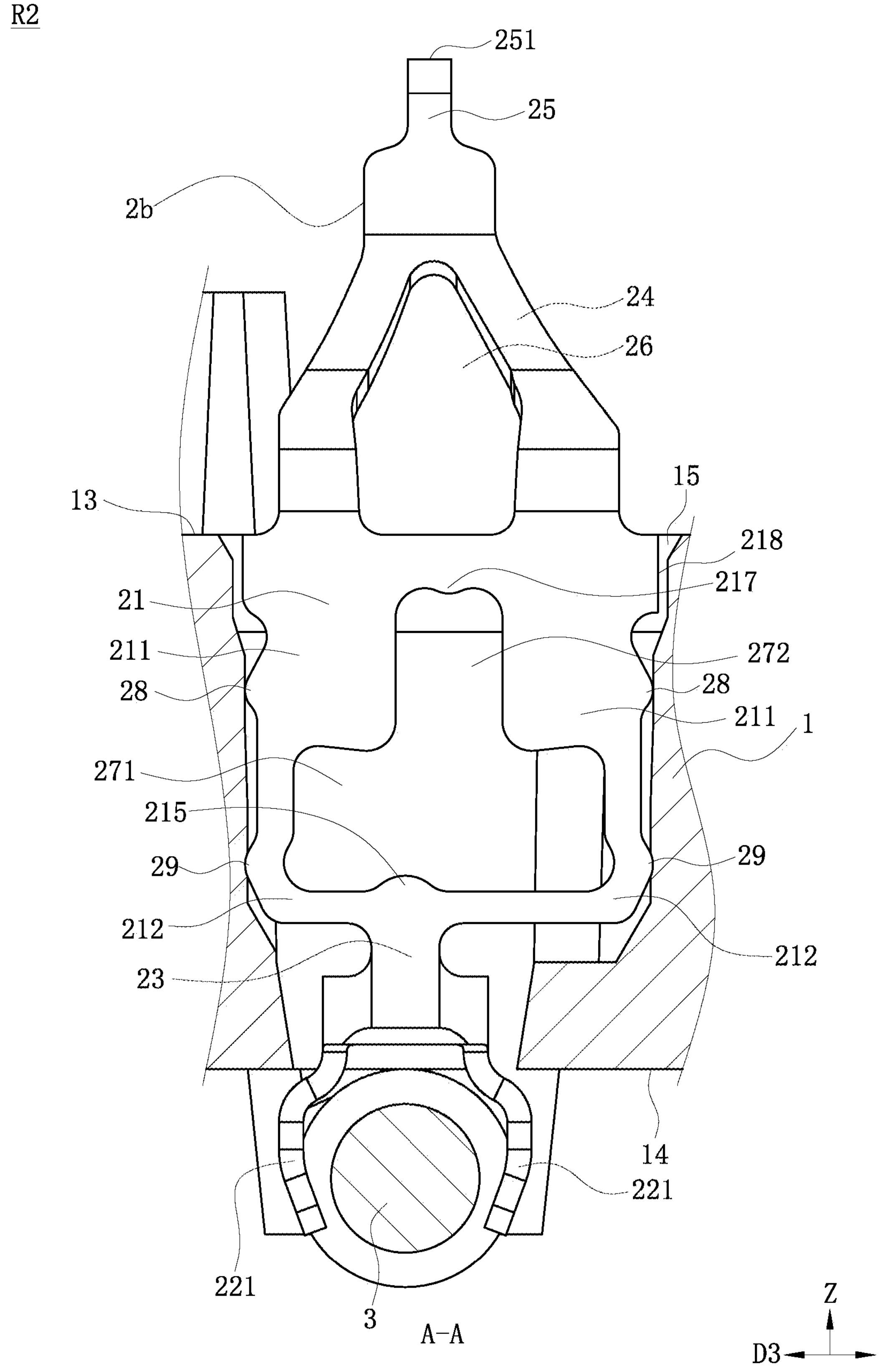
FIG. 6 is partial sectional view of FIG. 5 sectioned along the A-A direction.
Figure 7:
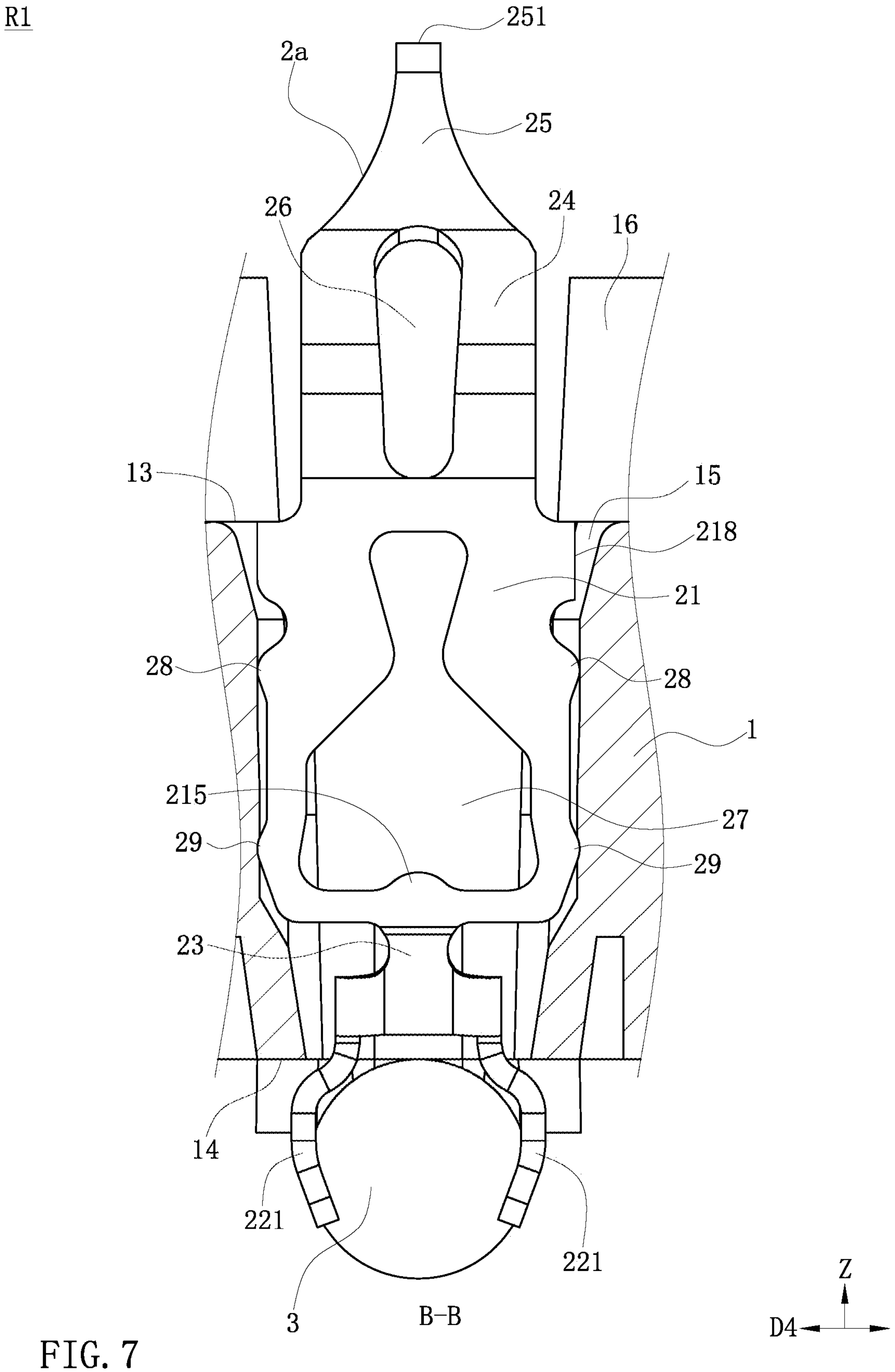
FIG. 7 is partial sectional view of FIG. 5 sectioned along the B-B direction.

As shown in FIG. 1 and FIG. 5, the insulating body 1 has a first region R1 and a second region R2. The conductive terminals 2 include a plurality of first terminals **2*a* provided in the first region R1 and a plurality of second terminals 2*b* provided in the second region R2. The first terminals 2*a* include a plurality of single-ended signal terminals used to transmit low speed signals, and the second terminals 2*b*** include a plurality of ground terminals 2G and a plurality of differential signal pairs. Each differential signal pair includes two differential signal terminals 2S. The differential signal terminals 2S are used to transmit high speed differential signals, and the ground terminals 2G are used to shield the differential signal pairs. For convenience to observe the arrangement of the second terminals 2*b*, the accompanying drawings in the present embodiment show only two differential signal terminals 2S and the surrounding eight ground terminals 2G adjacent to the two differential signal terminals 2S for illustration purposes.

As shown in FIG. 5, the first region R1 and the second region R2 are located in a frame-shaped region surrounded by the two first side edges 11 and the two second side edges 12, and an area surrounded by the two first side edges 11 and the two second side edges 12 and the areas of the first region R1 and the second region R2 are not in the actual ratio of the connector in reality. In reality, the area surrounded by the two first side edges 11 and the two second side edges 12 of the electrical connector 100 is far greater than the areas of the first region R1 and the second region R2, and the accompanying drawings in the present embodiment are simple schematic drawings for better describing the technical solutions of the present invention. In other embodiments, the technicians in the art may provide one or more first regions R1 and one or more second regions R2 according to actual needs.

As shown in FIG. 5, the first direction D1 is defined as a direction parallel to the first side edges 11, viewing from a top view angle, the elastic arm 24 of each first terminal $2_a$ extends along the first direction D1, which is parallel to the first side edges 11, and the elastic arm 24 of each second terminal $2_b$ extends along the second direction D2 forming an oblique angle with the first side edges 11. A third direction D3 and a fourth direction D4 are defined, where the third direction D3 is perpendicular to the second direction D2 and the vertical direction, and the fourth direction D4 is perpendicular to the first direction D1 and the vertical direction. The fourth direction D4 is parallel to the second side edges 12. The first terminals 2*a* are provided in a plurality of rows in the first direction D1, and the first terminals 2*a* in each row are aligned in the front-rear direction along the fourth direction D4. The second terminals 2*b* are provided in a plurality of rows in the third direction D3, and the second terminals 2*b* in each row are aligned in the front-rear direction along the second direction D2. In other embodiments, the elastic arm 24 of each first terminal 2*a* may extend along the first direction, which is perpendicular to the first side edges 11.

Figure 4:
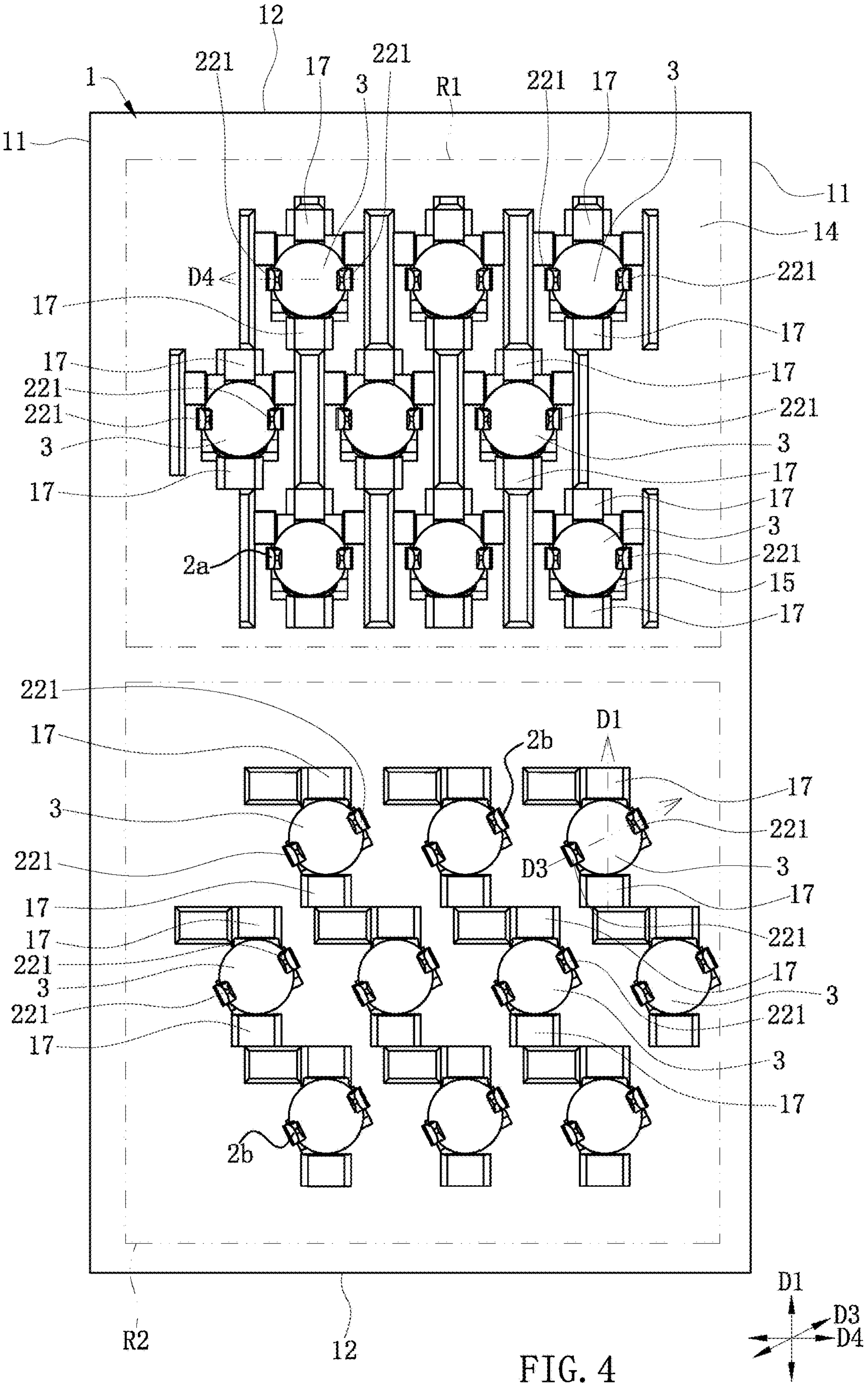
FIG. 4 is a bottom view of FIG. 1 being 180° inversed along the first direction after the assembly of the electrical connector is complete.

As shown in FIG. 1, FIG. 4 and FIG. 5, the insulating body 1 further has a plurality of supporting posts 16 extending from the upper surface 13 and a plurality of position limiting protruding blocks 17 extending downward from the lower surface 14. The supporting posts 16 are used to support the chip module upward, and the position limiting protruding blocks 17 are used to limit the positions of the solder balls 3. The supporting posts 16 include a plurality of first supporting posts 161 and a plurality of second supporting posts 162. The first supporting posts 161 are provided in the first region R1 and protrude upward from the upper surface 13 at the corresponding locations, and the second supporting posts 162 are provided in the second region R2 and protrude upward from the upper surface 13 at the corresponding locations. In the second region R2, the second terminals 2*b* in two adjacent rows are provided to be staggered in the third direction D3. One of the second supporting posts 162 is configured between two adjacent second terminals 2*b* aligned in the second direction D2. Each second supporting post 162 has two first side surfaces M1 provided opposite to each other in the third direction D3. Viewing from the top view angle, the abutting arm 25 is formed by extending from the elastic arm 24 toward one side of the second direction D2, and the two first side surfaces M1 of each second supporting post 162 are close to each other along the other side of the second direction D2.

As shown in FIG. 2 and FIG. 4, each accommodating hole 15 is configured with two of the position limiting protruding blocks 17. The two position limiting protruding blocks 17 are located at two opposite sides of the corresponding accommodating hole 15 in the first direction D1 and are provided right opposite to each other. The soldering portion 22 of each conductive terminal 2 includes two embracing arms 221 provided opposite to each other, and the two embracing arms 221 altogether clamp a solder ball 3.

As shown in FIG. 4, the two embracing arms 221 of each second terminal 2*b* are provided opposite to each other along the third direction D3, and the two embracing arms 221 of each first terminal 2*a* are provided opposite to each other along the fourth direction D4. The two position limiting protruding blocks 17 are used to limit the solder ball 3 from moving in the first direction D1. Viewing from a bottom view angle, a shortest distance between one of the two embracing arms 221 of each second terminal 2*b* and a same corresponding position limiting protruding block 17 and a shortest distance between the other of the two embracing arms 221 of each second terminal 2*b* and the same corresponding position limiting protruding block 17 are unequal, and a shortest distance between one of the two embracing arms 221 of each first terminal 2*a* and a same corresponding position limiting protruding block 17 and a shortest distance between the other of the two embracing arms 221 of each first terminal 2*a* and the same corresponding position limiting protruding block 17 are equal. The two embracing arms 221 of each first terminal 2*a* and any one of the two position limiting protruding blocks 17 are provided at intervals, and the two embracing arms 221 of each first terminal 2*a* are provided symmetrically relative to the first direction D1.

In the following description to the specific structures of the first terminals 2*a* and the second terminals 2*b*, the extending direction of each conductive terminal 2 is referenced for defining the position relationships between the structures of each conductive terminal 2. A vertical direction (Z-axis), a left-right direction (X-axis) and a front-rear direction (Y-axis) are defined, and the vertical direction of each conductive terminal 2 and the vertical direction of the insulating body 1 of the electrical connector 100 are consistent.

Figure 8:
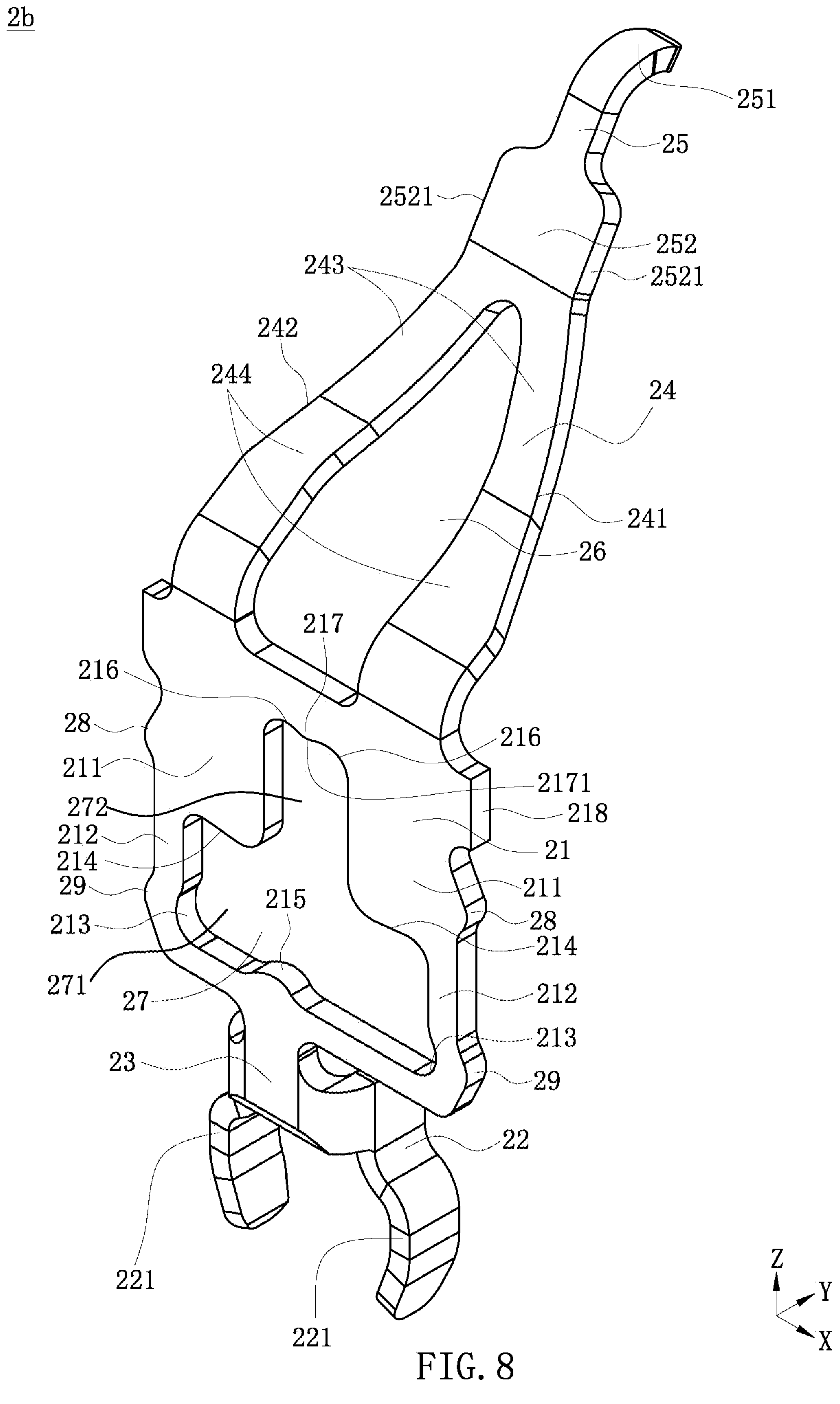
FIG. 8 is a perspective view of a second terminal in the electrical connector in FIG. 1.
Figure 11:
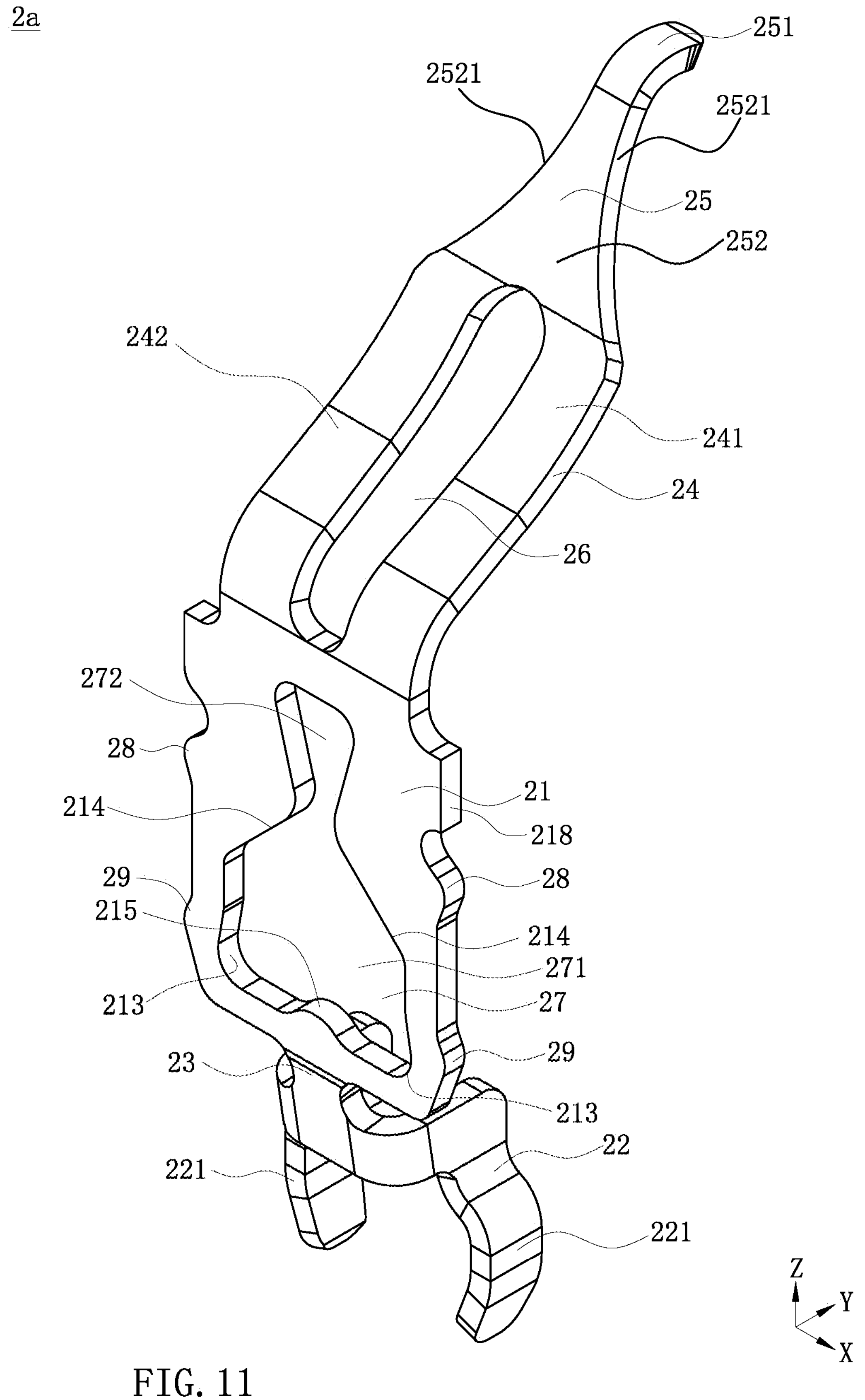
FIG. 11 is a perspective view of a first terminal in the electrical connector in FIG. 1.

FIG. 8 and FIG. 11 are perspective views of a first terminal 2*a* and a second terminal 2*b* of the electrical connector 100 respectively. The base portion 21 of each first terminal 2*a* and the base portion 21 of each second terminal 2*b* are flat plate structures extending vertically. In describing the specific structures of the first terminal 2*a*, an extending direction of a width of the base portion 21 of the first terminal 2*a* is defined as the left-right direction, an extending direction of a length of the base portion 21 of the first terminal 2*a* is defined as the vertical direction, and an extending direction of a thickness of the base portion 21 of the first terminal 2*a* is defined as the front-rear direction. Similarly, in describing the specific structures of the second terminal 2*b*, an extending direction of a width of the base portion 21 of the second terminal 2*b* is defined as the left-right direction, an extending direction of a length of the base portion 21 of the second terminal 2*b* is defined as the vertical direction, and an extending direction of a thickness of the base portion 21 of the second terminal 2*b* is defined as the front-rear direction. Thus, the two plate surfaces of the base portion 21 are provided opposite to each other in the front-rear direction, and the through hole 27 runs through the base portion 21 in the front-rear direction. A maximum width of the base portion 21 of each first terminal 2*a* is less than a maximum width of the base portion 21 of each second terminal 2*b*. The shapes of the wide portion 271 and the narrow portion 272 of each first terminal 2*a* are different from the shapes of the wide portion 271 and the narrow portion 272 of each second terminal 2*b*. A maximum width of the wide portion 271 of each first terminal 2*a* is less than a maximum width of the wide portion 271 of each second terminal 2*b*.

As shown in FIG. 8 and FIG. 11, each of the first terminals 2*a* and the second terminals 2*b* is provided with two of the protrusions correspondingly at each of the left and right sides of the base portion 21. The protrusions correspondingly located at two sides of the narrow portion 272 are defined as first protrusions 28, and the protrusions correspondingly located at two sides of the wide portion 271 are defined as second protrusions 29. The first protrusions 28 and the second protrusions 29 are provided at intervals vertically. The first protrusions 28 and the second protrusions 29 position the conductive terminal 2 in the corresponding accommodating hole 15 (referring to FIG. 6 and FIG. 7). In other embodiments, each of the left and right sides of the base portion 21 may be provided with more than two of the protrusions according to the actual needs, and the specific quantity of the protrusions is not hereinafter limited.

Figure 9:
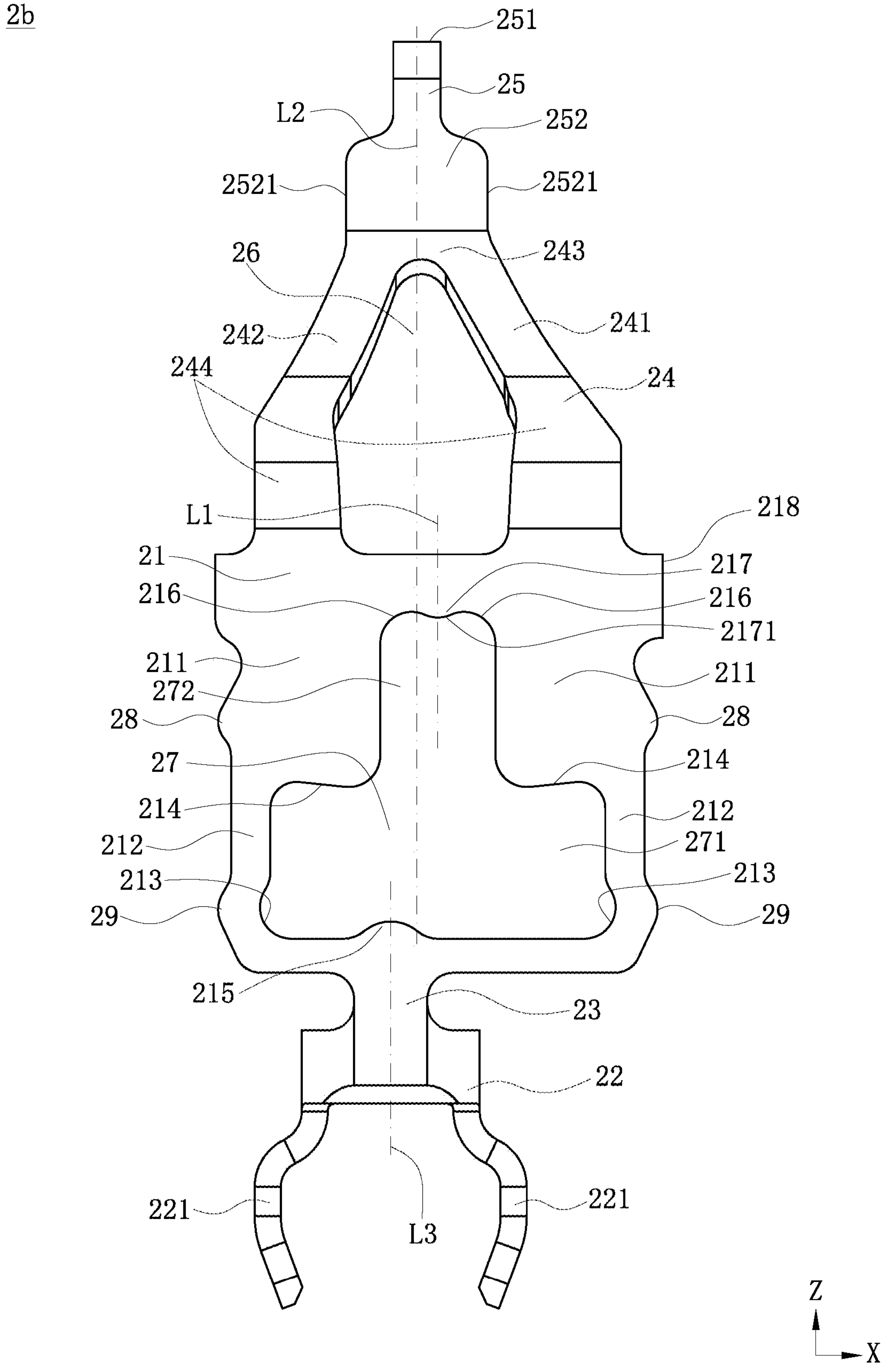
FIG. 9 is main view of FIG. 8.
Figure 10:
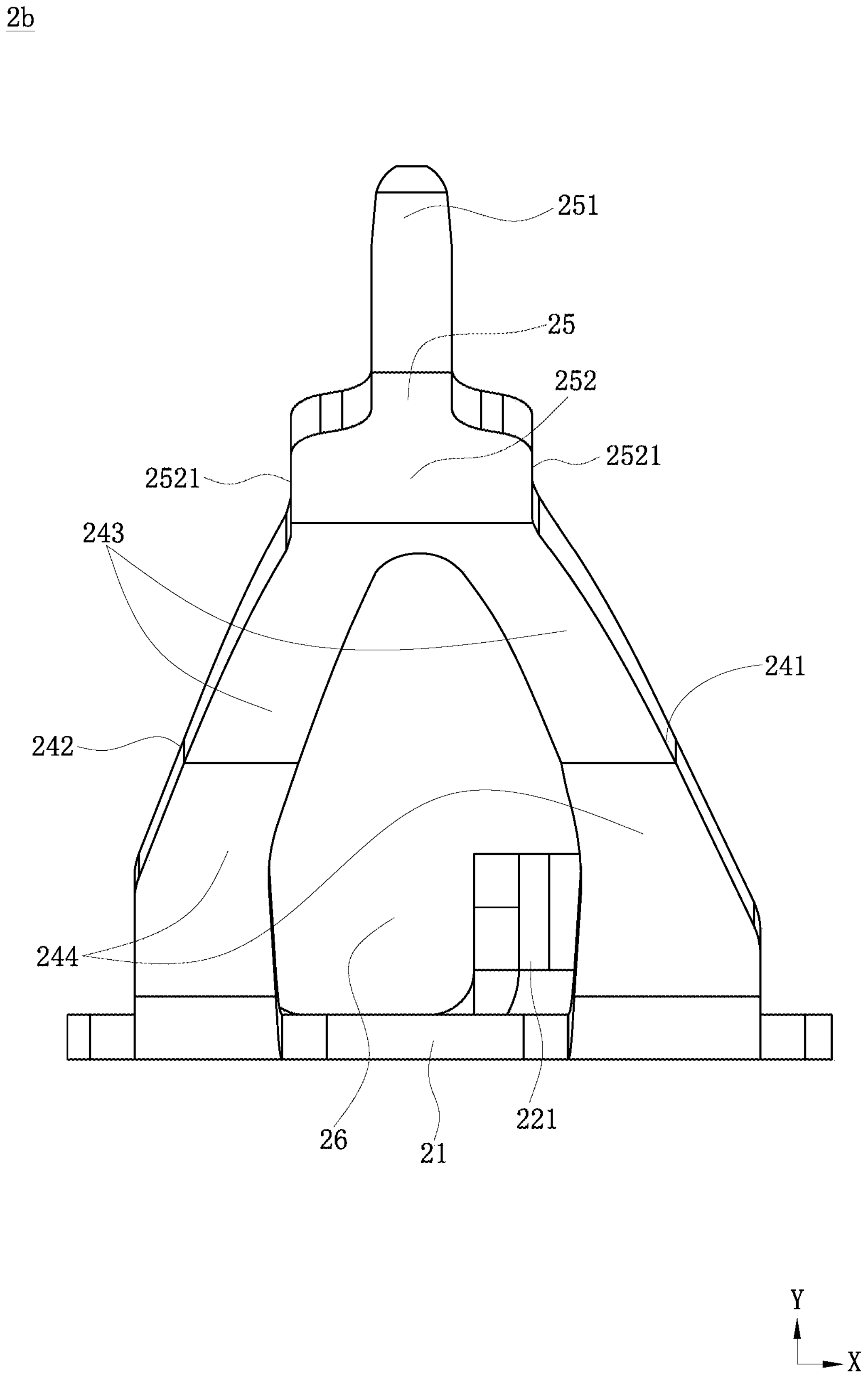
FIG. 10 is a top view of FIG. 8.
Figure 12:
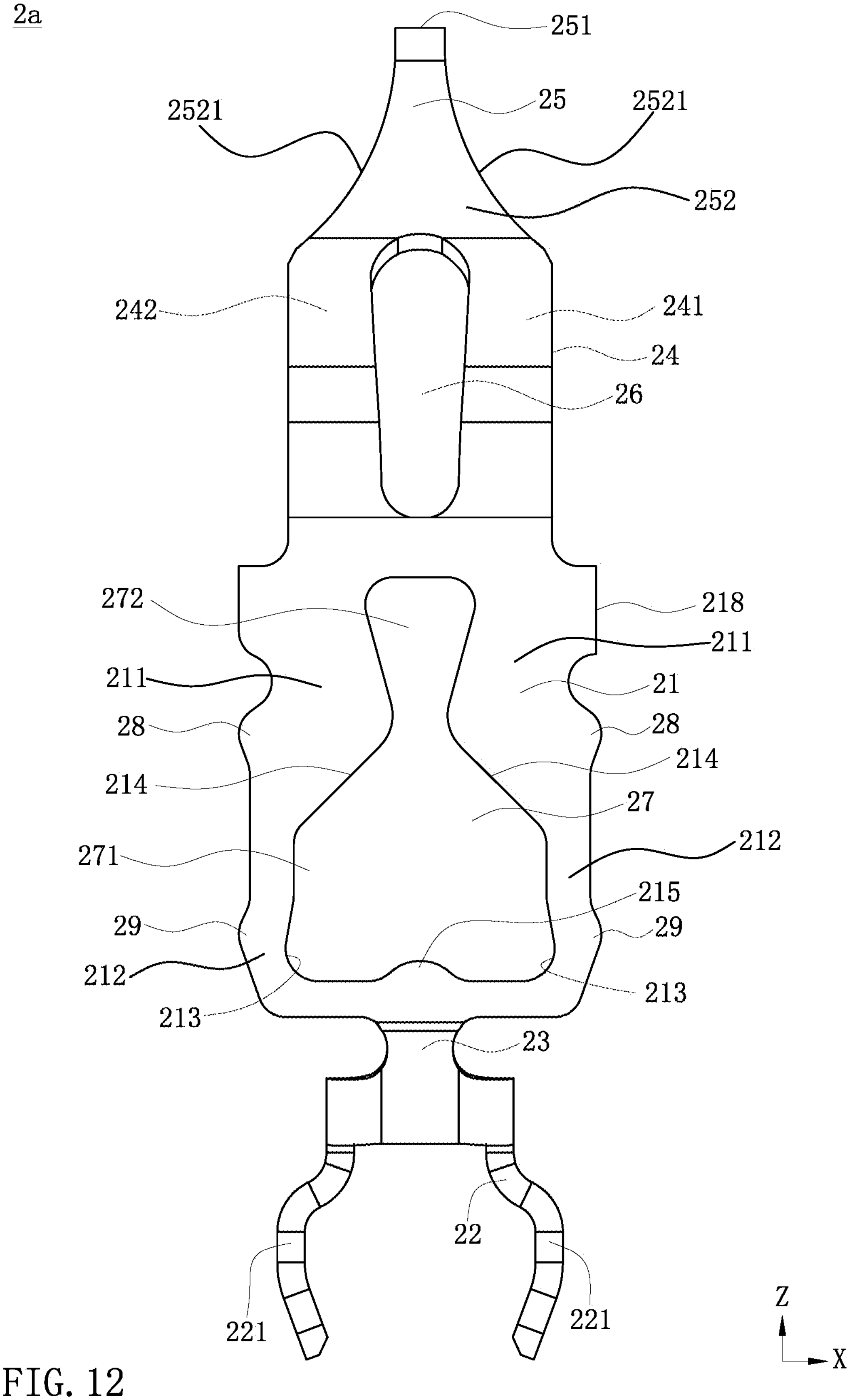
FIG. 12 is main view of FIG. 11.

As shown in FIG. 9 and FIG. 12, each of the base portion 21 of each first terminal 2*a* and the base portion 21 of each second terminal 2*b* has two first branches 211 and two second branches 212, two concave portions 213, two oblique surfaces 214 and a first bump 215. The two first branches 211 are formed at the left side and the right side of the narrow portion 272 and are connected to the second branches 212. The two second branches 212 are provided corresponding to the wide portion 271. Each second branch 212 is connected to one of the first branch 211, and the two second branches 212 are connected to the connecting portion 23. The sizes of the second branches 212 located at the left side and the right side of the wide portion 271 in the left-right direction is not greater than one half of the sizes of the first branches 211 in the left-right direction, and the sizes of the second branches 212 located below the wide portion 271 in the vertical direction is not greater than one half of the sizes of the first branches 211 in the left-right direction. Along the vertical direction, the first branches 211 are located above the second branches 212. That is, the metal plate of a portion of the base portion 21 adjacent to the elastic arm 24 in the vertical direction has more material, thereby ensuring the portion of the base portion 21 of each conductive terminal 2 adjacent to the elastic arm 24 to have higher strength, thus providing the supporting strength for the elastic arm 24. The wide portion 271 is provided to be closer to the connecting portion 23 than the narrow portion 272 in the vertical direction, such that the widths of the second branches 212 are less than the widths of the first branches 211. The widths of the second branches 212 are provided to be no greater than one half of the widths of the first branches 211, such that a portion of the base portion 21 adjacent to the connecting portion 23 has better flexibility.

As shown in FIG. 9 and FIG. 12, the two concave portions 213 of the first terminal 2*a* are located on the left and the right sides of the corresponding wide portion 271 and are formed by being concavely provided outward at the left and right sides of the corresponding wide portion 271. The two concave portions 213 of the second terminal 2*b* are located on the left and the right sides of the corresponding wide portion 271 and are formed by being concavely provided outward at the left and right sides of the corresponding wide portion 271. The two concave portions 213 and the two second protrusions 29 are provided correspondingly at the left-right direction, such that the rigidity of the second branches 212 at each portion maintain consistent as a whole. The two oblique surfaces 214 of each of the first terminals 2*a* are formed at a top portion of the corresponding wide portion 271. The two oblique surfaces 214 of each first terminal 2*a* are located at the left side and the right side of a bottom portion of the narrow portion 272, and the two oblique surfaces 214 are formed by obliquely extending upward from bottom thereof toward each other. The two oblique surfaces 214 of each second terminal 2*b* are formed at the top portion of the corresponding wide portion 271 and are located at the left side and the right side of the narrow portion 272, and the two oblique surfaces 214 are formed by obliquely extending downward from top thereof toward each other.

As shown in FIG. 9 and FIG. 12, each of the base portion 21 of each first terminal 2*a* and the base portion 21 of each second terminal 2*b* respective includes a strip connecting portion 218, and the strip connecting portion 218 is used to be connected to a strip of the terminals. The strip connecting portion 218 is located at one of the left or right sides of the corresponding base portion 21 and extends along the vertical direction, and the strip connecting portion 218 extends upward to a top end of the base portion 21.

As shown in FIG. 9 and FIG. 12, the first bump 215 of each of the first terminals 2*a* and the second terminals 2*b* is formed by protruding upward relative to a bottom portion of the corresponding wide portion 271. The connecting portion 23 is connected to two of the second branches 212 below the corresponding first bump 215. The bottom portion of the width portion 271 substantially forms a straight line. The first bump 215 separates the bottom portion of the width portion 271 to become two portions in the left-right direction. The first bump 215 bulges upward relative to the straight line, such that the conductive terminals 2 form a concave-convex fit during the punching process of forming the through holes 27, thus preventing the terminals from jumping in the strong convection generated when the punching device vibrates and the punch moves at high speed. Since the width of each second branch 212 in the vertical direction is short, and the width of the connecting portion 23 in the left-right direction is also short (for the reasons noted in the background), providing the first bump 215 at the position may prevent from jumping and may enhance the strength of the portion of the base portion 21 connecting the connecting portion 23.

As shown in FIG. 9 and FIG. 12, a maximum width of the elastic arm 24 of each first terminal 2*a* in the left-right direction is less than a maximum width of the elastic arm 24 of each second terminal 2*b* in the left-right direction. The elastic arm 24 of each of the first terminals 2*a* and the second terminals 2*b* includes a first elastic arm 241 and a second elastic arm 242 provided at an interval in the left-right direction, and a through slot 26 is formed between the first elastic arm 241 and the second elastic arm 242. The first elastic arm 241 and the second elastic arm 242 are both connected to the corresponding abutting arm 25 and the corresponding base portion 21. The first elastic arm 241 and the second elastic arm 242 of each first terminal 2*a* are provided symmetrically in the left-right direction, and the abutting arm 25 of each first terminal 2*a* is provided symmetrically in the left-right direction.

As shown in FIG. 9, for each second terminal 2*b*, the base portion 21 has a first central line L1 in the left-right direction, the contact portion 251 has a second central line L2 in the left-right direction, and the soldering portion 22 has a third central line L3 in the left-right direction. Along the left-right direction, the second central line L2 is located at one side of the first central line L1, and the first elastic arm 241 is located at the other side of the first central line L1. The second central line L2 of each second terminal 2*b* does not pass the corresponding second supporting post 162 (referring to FIG. 5).

As shown in FIG. 8 and FIG. 9, for each second terminal 2*b*, the base portion 21 of each second terminal 2*b* further includes two first curve surfaces 216 and a second bump 217. For each second terminal 2*b*, the two first curve surfaces 216 arch upward, and the second bump 217 has a second curve surface 2171 arching downward. The two first curve surfaces 216 are respectively located at a left side and a right side of the second bump 217 and are connected to the second curve surface 2171, such that the top structure of the narrow portion 272 is substantially wave shaped, thereby preventing from jumping. The second bump 217 is formed by protruding downward relative to a top portion of the narrow portion 272, and the first bump 215 and the second bump 217 are provided at an interval in the vertical direction. The second central line L2 passes through the first bump 215 and the second bump 217 along the vertical direction. That is, the first bump 215 and the second bump 217 are close to each other in the left-right direction, which is convenient for breaking the material.

As shown in FIG. 8 and FIG. 9, for each second terminal 2*b*, portions of the first elastic arm 241 and the second elastic arm 242 of each second terminal 2*b* are close to each other and extend obliquely upward from bottom thereof, such that an upper portion of the through slot 26 substantially forms a triangular structure. In other embodiments, the first elastic arm 241 and the second elastic arm 242 of each second terminal 2*b* may be provided such that only a portion of one of the first elastic arm 241 and the second elastic arm 242 is close to the other thereof and extends upward from bottom thereof, and the first elastic arm 241 and the second elastic arm 242 may be provided to be wholly close to each other and extend obliquely upward from bottom thereof. A maximum width of one end of the first elastic arm 241 away from the abutting arm 25 is provided to be greater than a maximum width of one end of the second elastic arm 242 away from the abutting arm 25, and a width of a location of the first elastic arm 241 connecting to the abutting arm 25 is equal to a width of a location of the second elastic arm 242 connecting to the abutting arm 25.

As shown in FIG. 8 and FIG. 9, for each second terminal 2*b*, the structure of the elastic arm 24 is divided in the vertical direction. The elastic arm 24 includes a first portion 243 and a second portion 244 connected to each other, and the first portion 243 is located above the corresponding second portion 244. The first portion 243 is connected to the corresponding abutting arm 25, and the second portion 244 is connected to the corresponding base portion 21. The through slot 26 extends on the first portion 243 and the second portion 244. That is, the portion of the elastic arm 24 close to the abutting portion 25 is the first portion 243, and the first portion 243 and the abutting arm 25 are provided symmetrically relative to the second central line L2 in the left-right direction. The portion of the elastic arm 24 close to the base portion 21 is the second portion 244.

As shown in FIG. 9 and FIG. 11, the two side surfaces 2521 of each first terminal 2*a* are curve-shaped and are provided opposite to each other along the left-right direction, and the two side surfaces 2521 of each first terminal 2*a* extend and are close to each other upward from bottom thereof. The two side surfaces 2521 of each second terminal 2*b* are parallel to each other in the left-right direction. Thus, the widening portion 252 of each second terminal 2*b* has a greater area, and the effect of the eight ground terminals 2G in the second region R2 shielding the two differential signal terminals 2S is better (referring to FIG. 5), thus reducing the crosstalk between adjacent differential signal pairs, thereby improving high frequency signals.

In sum, the electrical connector according to certain embodiments of the present invention has the following beneficial effects:

1. The elastic arm 24 of each second terminal 2*b* extends along the second direction D2 forming an oblique angle with the first side edges 11, thereby changing the arrangement of the second terminals 2*b*, such that the second terminals 2*b* in the second region R2 may be densified. That is, the insulating body 1 may receive more conductive terminals 2 in the same area, thereby increasing the signal transmission speed of the electrical connector 100. The elastic arm 24 of each first terminal 2*a* extends along the first direction D1 parallel to or perpendicular to the first side edges 11, which is equivalent to the arrangement of the first terminals 2*a* in the first region R1 not changing relative to the arrangement of the first terminals 2*a* in the related art, allowing the first terminals 2*a* to be assembled into the first region R1 of the insulating body 1, thus reducing the production cost for manufacturing the electrical connector 100.

2. The base portion 21 is provided with the through hole 27, thus reducing the overall rigidity of each conductive terminal 2, and preventing from solder crack. The through hole 27 is provided with the wide portion 271 and the narrow portion 272, which ensures the base portion 21 to have enough strength near the narrow portion 272, thus providing the strength for the deformation of the elastic arm 24 when being pressed downward.

3. The sizes of the second branches 212 located at the left side and the right side of the wide portion 271 in the left-right direction is not greater than one half of the sizes of the first branches 211 in the left-right direction, and the sizes of the second branches 212 located below the wide portion 271 in the vertical direction is not greater than one half of the sizes of the first branches 211 in the left-right direction, thus increasing the elasticity of the conductive terminals 2, and preventing from solder crack during the high temperature testing process.

4. The first protrusion 28 and the second protrusion 29 are provided at the left side and the right side of the base portion 21, such that each conductive terminal 2 may be stably fixed in the insulating body 1. The concave portions 213 are provided at the left side and the right side of the through hole 27, such that the widths of the second branches 212 located at the left side and the right side of the wide portion 271 are maintained basically consistent, thereby ensuring the overall flexibility of each second branch 271 to be in a stable state, such that each conductive terminal 2 may bear a uniform force and is not easily deformed.

5. The widening portion 252 is provided with two side surfaces 2521 parallel to each other, such that the abutting arm 25 has a greater area at the widening portion 252, thus enhancing the strength of the abutting arm 25 and increasing the shielding area of the ground terminals 2G against the adjacent conductive terminals 2 used to transmit signals.

6. The maximum width of one end of the first elastic arm 241 away from the abutting arm 25 in the left-right direction is provided to be greater than a maximum width of one end of the second elastic arm 242 away from the abutting arm 25 in the left-right direction, and along the left-right direction, the second central line L2 and the first elastic arm 241 are respectively provided at two sides of the first central line L1, such that when the chip module presses onto the electrical connector 100, the contact portion 251 does not bear the force and significantly deviate toward the left side and the right side, thereby ensuring the contact portion 251 to be located at the center stably to be electrically connected to the chip module.

7. The first bump 215 is formed by protruding toward a side away from the connecting portion 23 in the vertical direction relative to a bottom portion of each conductive terminal 2 corresponding to the through hole 27, such that the through holes 27 of the conductive terminals 2 form a concave-convex fit during the punching process, thereby preventing from jumping. During the soldering process for soldering the soldering portion 22 with the circuit board through the solder, the insulating body 1 is heated and deformed to warp, pulling the connecting portion 23 and generating stress concentration at the connecting portion 23. By providing the connecting portion 23 below the first bump 215 to be connected to the base portion 21, a height of the location of the base portion 21 corresponding to the connecting portion 23 in the vertical direction is increased, thus enhancing the strength of the location of the base portion 21 connecting to the connecting portion 23, thereby achieving the effect of preventing the conductive terminal 2 from deforming.

8. The second bump 217 is formed by protruding toward a side away from the connecting portion 23 in the vertical direction relative to a top portion of each conductive terminal 2 corresponding to the through hole 27, and the first bump 215 and the second bump 217 are provided at an interval in the vertical direction, thus enhancing the concave-convex fit of the conductive terminals 2 in the punching process, thereby preventing the through hole 27 from jumping upward in the breaking process, and preventing from affecting the forming of the next conductive terminal 2.

9. The second central line L2 passes through the first bump 215 and the second bump 217 along the vertical direction. That is, a distance between the first bump 215 and the second bump 217 in the left-right direction is close, such that the shape of the through hole 27 is relatively regular, and the metal plate bears a uniform force in the punching process, such that the punching is more stable and blanking is easier.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:

an insulating body, having an upper surface and a lower surface provided opposite to each other along a vertical direction, wherein the insulating body has at least one first region and at least one second region, the insulating body has two first side edges provided opposite to each other and two second side edges provided opposite to each other, and the first side edges and the second side edges are perpendicular to each other; and a plurality of conductive terminals, wherein each of the conductive terminals has an elastic arm and an abutting arm connected to the elastic arm, the abutting arm has a contact portion, the conductive terminals comprise a plurality of first terminals provided in the first region and a plurality of second terminals provided in the second region, and viewing from a top view angle, the elastic arm of each of the first terminals extends along a first direction parallel to or perpendicular to the first side edges, the elastic arm of each of the second terminals extends along a second direction forming an oblique angle with the first side edges, and the first direction and the second direction are both perpendicular to the vertical direction.

2. The electrical connector according to claim 1, wherein the insulating body has a plurality of accommodating holes running through the upper surface and the lower surface, the conductive terminals are one-to-one correspondingly accommodated in the accommodating holes, the elastic arms of the conductive terminals are exposed upward out of the upper surface, each of the conductive terminals has a soldering portion, the soldering portions of the conductive terminals are exposed downward out of the lower surface, the insulating body further has a plurality of position limiting protruding blocks protruding downward out of the lower surface, each of the accommodating holes are provided with two of the position limiting protruding blocks, the two of the position limiting protruding blocks are located at two opposite sides of a corresponding one of the accommodating holes in the first direction and are provided right opposite to each other, the soldering portion of each of the conductive terminals comprises two embracing arms provided opposite to each other, the two embracing arms altogether clamp a solder ball, the two of the position limiting protruding blocks are configured to limit the solder ball from moving in the first direction, the two embracing arms of each of the second terminals are provided opposite to each other along a third direction, the third direction is perpendicular to the second direction and the vertical direction, and viewing from a bottom view angle, a shortest distance between one of the two embracing arms of each of the second terminals and a same corresponding one of the position limiting protruding blocks and a shortest distance between the other of the two embracing arms of each of the second terminals and the same corresponding one of the position limiting protruding blocks are unequal.

3. The electrical connector according to claim 2, wherein viewing from the bottom view angle, the two embracing arms of each of the first terminals and each of two corresponding ones of the position limiting protruding blocks are provided at intervals, and the two embracing arms of each of the first terminals are provided symmetrically relative to the first direction.

4. The electrical connector according to claim 1, wherein the first terminals comprise single-ended signal terminals, and the second terminals comprise ground terminals and differential signal terminals.

5. The electrical connector according to claim 1, wherein each of the first terminals and the second terminals has a base portion, a through hole running through the base portion and a through slot running through the elastic arm, the base portion is located below the contact portion and is connected to the elastic arm, a maximum width of the base portion of each of the first terminals in a direction perpendicular to the vertical direction is less than a maximum width of the base portion of each of the second terminals in the direction perpendicular to the vertical direction, and a maximum width of the elastic portion of each of the first terminals in the direction perpendicular to the vertical direction is less than a maximum width of the elastic arm of each of the second terminals in the direction perpendicular to the vertical direction.

6. The electrical connector according to claim 1, wherein each of the conductive terminals has a base portion connected to one end of the elastic arm and a through hole running through the base portion, the base portion is provided in the insulating body, the through hole has a wide portion and a narrow portion, the wide portion is in upward communication with the narrow portion, a maximum width of the wide portion of each of the first terminals in a direction perpendicular to the vertical direction is less than a maximum width of the wide portion of each of the second terminals in the direction perpendicular to the vertical direction.

7. The electrical connector according to claim 1, wherein each of the second terminals further has a base portion located in the insulating body, the base portion has a width direction being defined to be perpendicular to the vertical direction, the elastic arm of each of the second terminals is formed by extending upward from the corresponding base portion, the elastic arm of each of the second terminals has a first elastic arm and a second elastic arm provided at an interval in the width direction, a through slot is formed between the first elastic arm and the second elastic arm, one end of the first elastic arm is connected to the abutting arm, one end of the second elastic arm is connected to the corresponding abutting arm, a maximum width of another end of the first elastic arm away from the corresponding abutting arm in the width direction is greater than a maximum width of another end of the second elastic arm away from the corresponding abutting arm in the width direction, a first central line is defined for the base portion in the width direction, a second central line is defined for the contact portion in the width direction, and in the width direction, the second central line and the first elastic arm are located at two opposite sides of the first central line.

8. The electrical connector according to claim 7, wherein the base portion is a flat plate structure extending vertically, the through slot extends to an upper end of the base portion, and a width of a connecting location of the first elastic arm and the corresponding abutting arm is equal to a width of a connecting location of the second elastic arm and the corresponding abutting arm.

9. The electrical connector according to claim 7, wherein the elastic arm of each of the second terminals comprises a first portion and a second portion connected to each other, the first portion is connected to the corresponding abutting arm, the second portion is connected to the corresponding base portion, the through slot extends on the first portion and the second portion, and the first portion and the corresponding abutting arm are provided symmetrically relative to the second central line.

10. The electrical connector according to claim 7, wherein each of the second terminals has a soldering portion located below the corresponding base portion, a third central line is defined for the soldering portion in the width direction, and the third central line and the second central line are located at a same side of the first central line in the width direction.

11. The electrical connector according to claim 1, wherein the insulating body is provided with a plurality of first supporting posts protruding from the upper surface and corresponding to the first region and a plurality of second supporting posts protruding from the upper surface and corresponding to the second region, the second terminals are provided in a plurality of rows along the second direction, two adjacent rows of the second terminals are provided to be staggered, one of the second supporting posts is configured between two adjacent ones of the second terminals aligned in the second direction, a third direction is defined to be perpendicular to the second direction and the vertical direction, each of the second supporting posts has two first side surfaces provided opposite to each other in the third direction, a second central line is defined for the contact portion of each of the second terminals in the third direction, the second central line does not pass a corresponding one of the second supporting posts, and viewing from the top view angle, the abutting arm of each of the second terminals is formed by extending from the corresponding elastic arm toward one side of the second direction, and the two first side surfaces are close to each other along the other side of the second direction.

* * * * *